United States Patent [19]

Zalar et al.

[11] 4,097,842
[45] Jun. 27, 1978

[54] DECELERATION INDICATION SYSTEM

[75] Inventors: David R. Zalar, Wales; James E. Hansen, Oak Creek, both of Wis.

[73] Assignee: Cutler-Hammer, Inc., Milwaukee, Wis.

[21] Appl. No.: 712,808

[22] Filed: Aug. 9, 1976

[51] Int. Cl.² .................... B60Q 1/26; G08B 21/00; G01P 3/42; G01P 15/00
[52] U.S. Cl. ........................................ 340/71; 340/262
[58] Field of Search .................... 340/71, 62, 262; 324/160–169; 328/148, 132; 317/5; 307/233 R, 233 A, 233 B

[56] References Cited

U.S. PATENT DOCUMENTS

| | | | |
|---|---|---|---|
| 3,564,532 | 2/1971 | Ando | 340/262 |
| 3,601,794 | 8/1971 | Blomenkamp | 340/62 |
| 3,772,567 | 11/1973 | Leiber et al. | 317/5 |
| 3,781,692 | 12/1973 | Escoffier | 307/233 |
| 3,790,932 | 2/1974 | Ridpath | 340/71 X |
| 3,794,972 | 2/1974 | Van Ostrom | 340/62 |
| 3,824,577 | 7/1974 | Stickney | 340/262 |
| 3,853,002 | 12/1974 | Peck | 324/162 X |

*Primary Examiner*—Donald J. Yusko
*Attorney, Agent, or Firm*—Hugh R. Rather; William A. Autio; Michael E. Taken

[57] ABSTRACT

A deceleration indication system for use on motor vehicles to indicate to the trailing driver that the leading vehicle is decelerating thereby to prevent rear end collisions. The system is of the solid state type and is arranged to detect and respond to decrease in the rate of operation of the ignition system of a motor vehicle to light amber indication lamps at the rear of the vehicle. Since the speed of the vehicle is proportional to the rate of operation of its ignition system, these lamps will give an immediate indication to the trailing driver that the leading vehicle is decelerating thereby affording the trailing driver with more time for braking.

7 Claims, 5 Drawing Figures

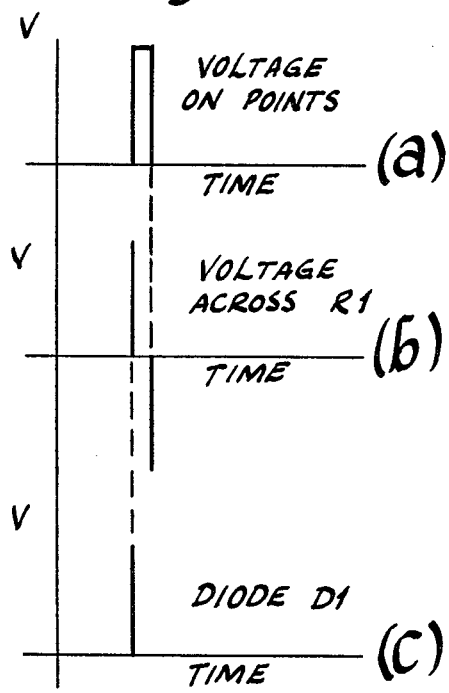
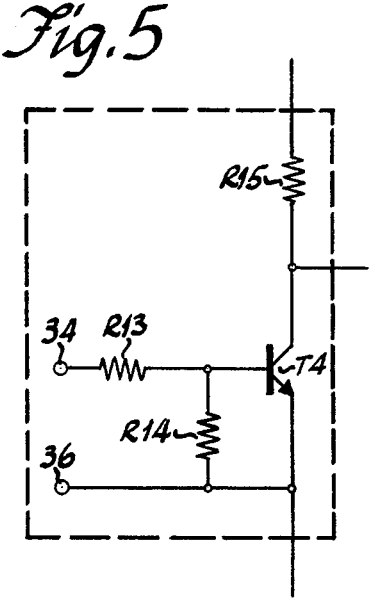
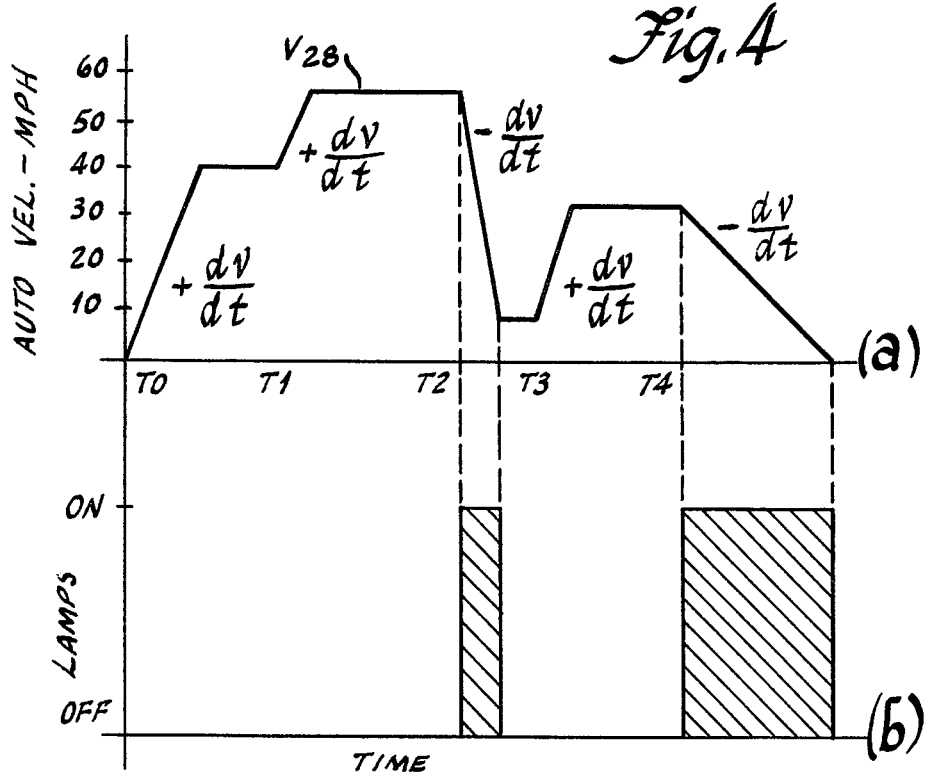

DECELERATION INDICATION SYSTEM

BACKGROUND OF THE INVENTION

Deceleration indication systems have been known heretofore. These systems have employed various means for sensing speed so as to afford an indication of a change in speed or deceleration. For example, inertia of a suspended weight or a series of inertia switches have been suggested as deceleration sensing devices. The motor vehicle brake pedal, or the hydraulic brake master cylinder, or the brake producing hydraulic pressure has been used to operate an indicator lamp. Also, a magnetic pulse generator rotatable in accordance with the speed of the motor vehicle or a related structure has been proposed for operating a speed change indicator. Moreover, a vacuum operated switch at the intake manifold of a motor vehicle has been suggested as capable of sensing when the driver removes his foot from the gas pedal. While these prior systems have been useful for their intended purposes, this invention relates to improvements thereover.

SUMMARY OF THE INVENTION

An object of the invention is to provide an improved deceleration indication system.

A more specific object of the invention is to provide an improved deceleration indication system that provides a signal to the following driver whenever the leading motor vehicle decelerates regardless of braking action.

Another specific object of the invention is to provide an improved deceleration indication system that provides a signal to the following driver as soon as the engine speed of the leading motor vehicle starts to decrease, thus eliminating any delay that might otherwise occur.

Another specific object of the invention is to provide an improved deceleration indication system that functions to provide a signal to the following driver only on actual engine deceleration.

Another specific object of the invention is to provide improved deceleration indication systems of the aforementioned type that are operable with conventional breaker points or electronic ignition systems.

Another specific object of the invention is to provide an improved deceleration indication system of the aforementioned type that is simple and economical in construction and easily connectable to a motor vehicle ignition system and does not require any special transducer.

Other objects and advantages of the invention will hereinafter appear.

BRIEF DESCRIPTION OF THE DRAWINGS

FIG. 3 is a graph showing operating characteristics of the differentiator and rectifier portion of the system of FIG. 2;

FIG. 4 is a graph showing operating characteristics of the output portions of the system of FIG. 2; and FIG. 5 shows a modification enabling use of the system of FIG. 2 with an electronic ignition system.

DESCRIPTION OF THE PREFERRED EMBODIMENT

Figure 1:
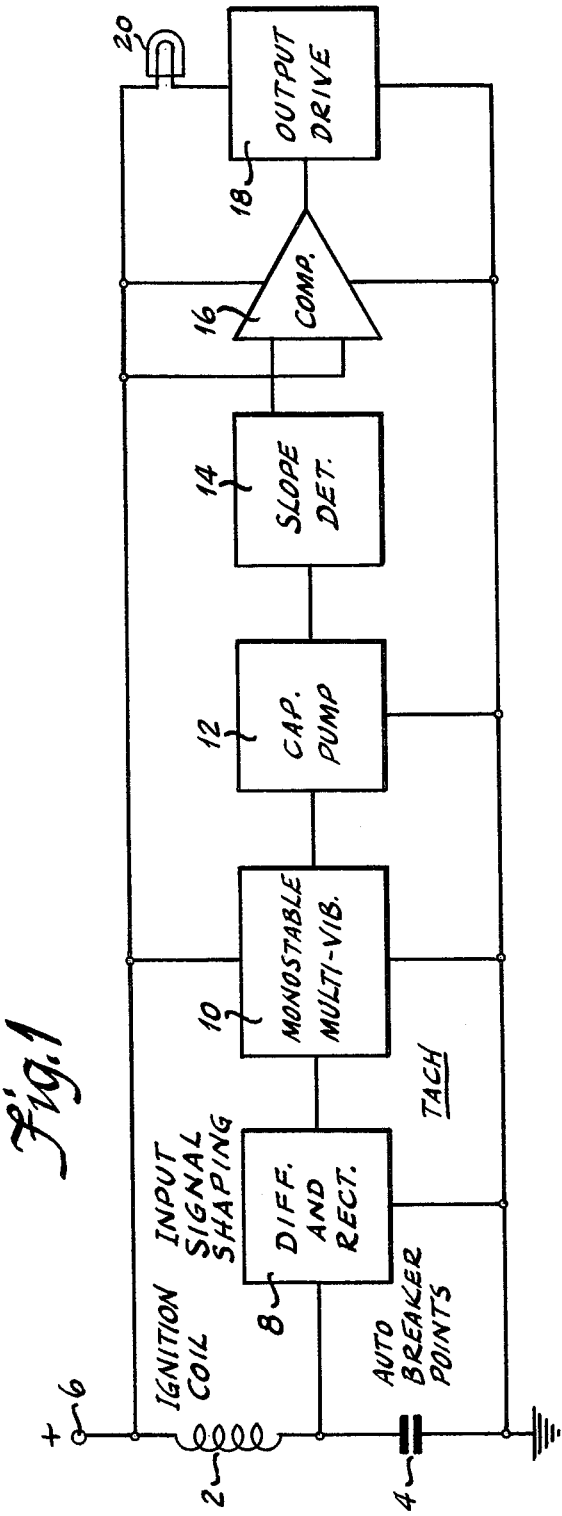
FIG. 1 is a block diagram of a deceleration indication system showing generally the component parts thereof.

Referring to FIG. 1, there is shown in a general manner a deceleration indication system constructed in accordance with the invention. As shown therein, the primary winding 2 of the ignition coil and the breaker points or contacts 4 of an automobile are connected from a D.C. source to ground, this D.C. source 6 being the automobile storage battery of 12 volts D.C. or the like.

The deceleration indication system is connected across the breaker points and is supplied from the same D.C. source 6. This system comprises an input signal shaping circuit 8 including a differentiator and a rectifier circuit, hereinafter described, connected across the breaker points. The purpose of this signal shaping circuit 8 is to provide a pulse of the required polarity for each opening of the breaker points as hereinafter described for use in operating a monostable multivibrator 10, these parts forming a tachometer whose output is a function of the engine speed.

As shown in FIG. 1, this monostable multivibrator is supplied from D.C. source 6 and is connected to the output of the signal shaping circuit. The purpose of this monostable multivibrator is to provide uniform width pulses in response to the successive openings of the breaker points so that its output frequency and thus its average output voltage is a function of the engine speed.

A voltage control circuit or pulse-to-voltage responsive circuit 12, such as a capacitor "filter" or "integrator" or "pump", is connected to the output of the monostable multivibrator which converts the "on" versus "off" duty cycle of the pulses to an average D.C. voltage. The D.C. voltage produced will vary with the duty cycle of the pulses (that is, engine RPM), going upward with increasing RPM and downward with decreasing RPM. A slope detector circuit 14, such as a differentiator circuit, is connected to the output of the capacitor integrator to detect voltage changes. The slope detector output is then fed to a voltage comparator circuit such as an operational amplifier 16 which is conditioned to respond to a negative-going voltage from the slope detector. The comparator circuit then drives a power switching circuit 18 capable of energizing a signal device such as an indicator lamp 20.

With this arrangement, each time the motor vehicle engine starts to slow down, lamp 20 is lit to indicate to the trailing driver that the automobile ahead is starting to decelerate. This signal is provided before any slow-down would become apparent from vehicle observation and therefore provides the additional critical time for the trailing driver to initiate braking action.

Figure 2:
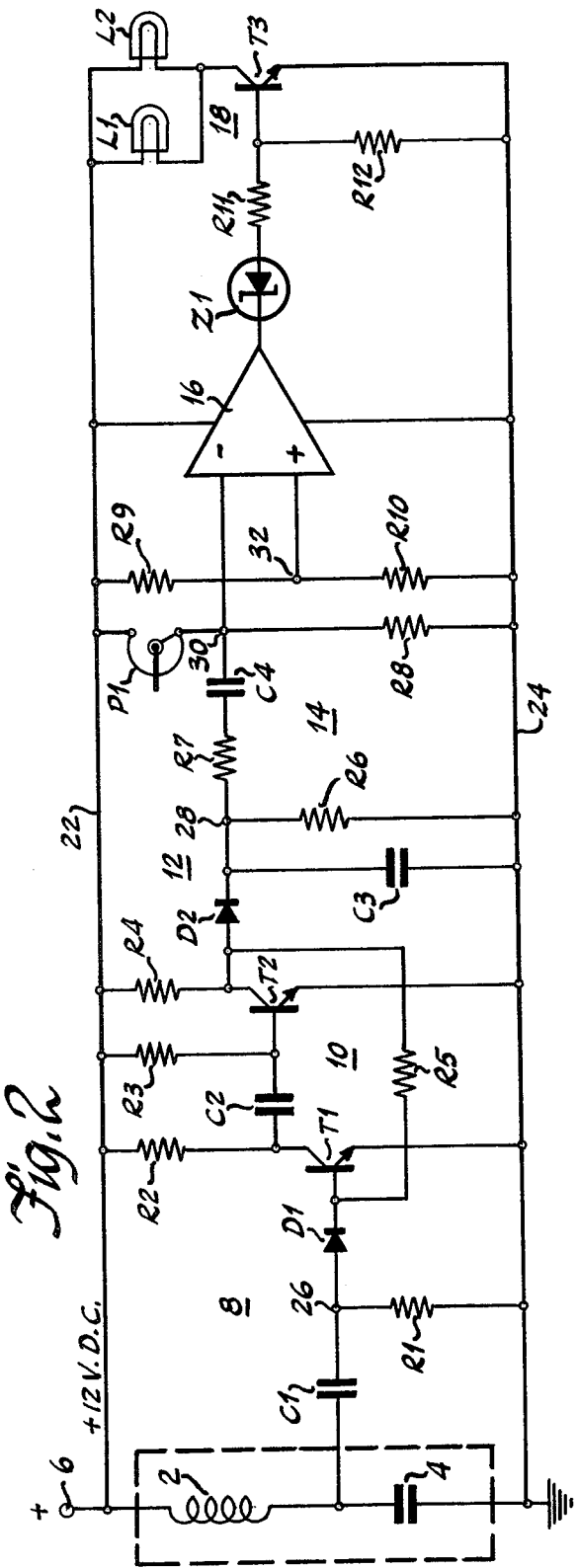
FIG. 2 is a schematic circuit diagram showing the circuit details of the deceleration indication system of FIG. 1.

FIG. 2 shows the system of FIG. 1 in more detail. At the left-hand side of FIG. 2, the coil primary winding 2 and breaker points 4 are shown connected in series between battery 6 and ground as in FIG. 1. Battery 6 supplies a 12 volt positive voltage to conductor 22 and ground is connected to conductor 24.

The differentiator comprises a capacitor C1 and a resistor R1 connected in series across breaker points 4 for providing an output voltage proportional to the derivative, or rate of change, of its input signal. With this arrangement, each time the breaker points open or close, a voltage pulse appears at junction 26 between capacitor C1 and resistor R1 indicative of the change in voltage across the breaker points. FIG. 3 shows in curve (a) the voltage across the breaker points. When the points open, the voltage rises and when the points close, the voltage drops to zero. The differentiator provides a pulse for each such change in voltage as shown by curve (b) in FIG. 3. As the voltage in curve (a) rises, the differentiator provides a positive pulse as shown in curve (b), and when the breaker voltage in curve (a) decreases, the differentiator provides a negative pulse as shown in curve (b).

The rectifier comprises diode D1 and its purpose is to clip the negative pulse as shown by curve (c) in FIG. 3 thereby leaving positive pulses corresponding to the leading edges of the respective breaker pulses for application to the monostable multivibrator.

This monostable multivibrator 10 comprises a pair of transistors T1 and T2, four resistors R2, R3, R4 and R5, and a capacitor C2. Transistor T1 has its base connected to the cathode of diode D1, its collector connected through resistor R2 to positive conductor 22, and its emitter connected to ground conductor 24. The collector of transistor T1 is connected through capacitor C2 to the base of transistor T2 which has its base connected through resistor R3 to positive conductor 22, its collector connected through resistor R4 to positive conductor 22, and its emitter connected to ground conductor 24. The output of the monostable multivibrator at the collector of transistor T2 is fed back by being connected through resistor R5 to the input thereof at the base of transistor T1.

With this arrangement, the monostable multivibrator, which is also known as a one-shot multivibrator, a start-stop multivibrator, a single-shot multivibrator, or a univibrator, provides a constant pulse width for each operation of the breaker points whereby the output at the collector of transistor T2 is a function of the engine speed.

The capacitor pump 12 comprises a diode D2, a capacitor C3 and a resistor R6. Diode D2 is connected in its forward low impedance direction from the collector of transistor T2 through capacitor C3 to ground conductor 24 while resistor R6 is connected across capacitor C3. Thus, the uniform width voltage pulses from the output of the monostable multivibrator pass through diode D2 to pump up capacitor C3. More specifically, the pulses fed to capacitor C3 tend to charge this capacitor upward in voltage. Resistor R6 tends to discharge capacitor C3 toward zero voltage at a controlled rate. Diode D2 prevents transistor T2 from dumping capacitor C3 when transistor T2 turns on. At a given pulse rate or duty cycle, corresponding to a given engine RPM, a specific average D.C. voltage will result across capacitor C3. Faster pulse rates will produce a higher capacitor voltage due to the greater pulse "on" versus "off" duty cycle ratio. Resistor R6 has less time to discharge capacitor C3 between pulses. Lower engine RPM's or lower pulse rates consequently produce a lower average voltage across capacitor C3. At any constant rate, the capacitor C3 voltage average remains constant. When engine RPM's change, the capacitor C3 voltage at junction 28 changes at a corresponding rate, producing a sloped waveform as illustrated in FIG. 4a. The faster the engine acceleration or deceleration ($dv/dt$), the steeper the voltage wavefront at junction 28.

The voltage at junction 28 is applied to slope detection circuit 14. Thus, any voltage slope, that is, voltage change, at junction 28 will be applied through resistor R7 and capacitor C4 to junction 30. Resistor R7, capacitor C4, resistor R8 and potentiometer P1 form a differentiator circuit with a time constant long enough to couple voltage changes to the comparator circuit input throughout anticipated deceleration times of a vehicle; see FIG. 4b.

The voltage comparator shown comprises an operational amplifier 16 such as a type 741 integrated circuit device which is biased to operate as a comparator or threshold switch. Resistors R9 and R10 form a voltage divider to bias the non-inverting input 32 of the "op-amp" to a reference level of approximately one-half of the supply voltage. The inverting input 30 is biased similarly by the voltage divider P1 and R8, but is intentionally biased slightly more positive than the non-inverting input. This voltage relationship on the input of the amplifier in effect "switches" the amplifier output, due to its very high voltage gain, to a low level near ground potential. If the inverting input were for any reason biased at a lower voltage than the non-inverting input, even only a few millivolts, the high gain would then cause the output to switch to its high level near the supply voltage. The action is more that of a switch than of a linear amplifier; hence the threshold detector or comparator action.

The slope detector circuit functions to force the inverting input downward, thus producing the switching effect on the amplifier as described above. The condition will occur only as long as a downward sloping voltage exists through the differentiation network from junctions 28 and 30. During acceleration periods, when the voltage has a positive slope, the inverting input is forced in the opposite direction, making it even more positive in potential than produced by the bias from divider P1 and R8. In this direction, however, the amplifier input is merely biased further off. Consequently, no change results at its output. Amplifier switching consequently occurs only during a negative slope, deceleration.

The sensitivity of the circuit can be controlled by adjusting the magnitude of offset bias on the amplifier input between junctions 30 and 32. Potentiometer P1 permits this adjustment. The further positive junction 30 is with respect to junction 32, the more the slope detector must force it downward before the amplifier can be switched.

The output of amplifier 16 is then fed to the base of a power transistor T3 through zener diode Z1 and resistor R11. The zener diode provides an offset voltage between the amplifier output and the base of transistor T3 for reliable turn off. Resistor R11 limits the current into the base of transistor T3, and resistor R12 is a conventional base to emitter return resistor.

When the output of amplifier 16 is switched high during deceleration, transistor T3 is biased on and energizes the output lamp or lamps, or relay or any appropriate indicator or control element. FIG. 4b illustrates indicator action with deceleration.

These lamps are mounted at the rear of the leading automobile and indicate to the trailing driver that the automobile ahead is decelerating. This indication provides maximum time for the trailing driver to initiate braking action in a situation where fractions of a second become important.

This added warning time will reduce rear end collisions. The average reaction time for a driver to remove his foot from the accelerator and depress the brake pedal is about ¾ of a second. An auto traveling at 55 miles an hour travels about 61 feet in that time. There is less and less time for each successive driver in line to stop until the 8th or 9th driver cannot avoid a rear-end collision. Each vehicle having the deceleration indication system would provide an additional average of ⅔ of a second warning to the trailing driver, thereby substantially reducing collision occurrence.

The invention will indicate reduction of speed, not necessarily caused by braking, thus avoiding dangerous situations occasioned by diminishing reaction time. Also, deceleration by down-shifting or use of engine compression therefor, would be signalled.

FIG. 5 shows a circuit that could be substituted for the broken line enclosed portion of FIG. 2 to modify the system for transistorized ignition use. As shown therein, a pair of input terminals 34 and 36 may be connected across a voltage pulse circuit in an electronic or transistorized ignition system. The interface may be to a load resistor of a PNP transistor in the transistorized ignition system. Terminal 34 is connected through resistors R13 and R14 to terminal 36 which is grounded in FIG. 2. The junction between these resistors is connected to the base of transistor T4 having its emitter grounded and its collector connected through resistor R15 to the automobile battery in FIG. 2. The collector of transistor T4 is connected to capacitor C1 in FIG. 2.

From the foregoing, it will be seen that whenever transistor T4 is turned off, the effect is the same as opening the breaker points in FIG. 2, that is, a positive voltage pulse will be applied to capacitor C1. This transistor T4 is controlled by pulses at input terminals 34 and 36. When a positive pulse is applied to terminal 34, transistor T4 is rendered conducting and when this input pulse terminates, transistor T4 is rendered non-conducting or turned off. Transistor T4 acts as an amplifier whereby a lower level signal from a transistorized ignition will be raised to the level required for operation of the circuit of FIG. 2.

While the systems hereinbefore described are effectively adapted to fulfill the objects stated, it is to be understood that the invention is not intended to be confined to the particular preferred embodiments of deceleration indication systems disclosed, inasmuch as they are susceptible of various modifications without departing from the scope of the appended claims.

We claim:

1. A deceleration indication system adapted to be connected to the ignition system of a leading motor vehicle to provide a signal to the following driver whenever the engine speed of the leading motor vehicle decreases comprising:
   a tachometer operable to receive input pulses from the ignition system of the leading motor vehicle indicative of engine speed and to provide respective uniform-width control pulses having a frequency proportional to said engine speed and variable therewith;
   a voltage control circuit responsive to said control pulses for providing a voltage change having a positive slope when said pulse frequency is increasing on engine acceleration or a voltage change having a negative slope when said pulse frequency is decreasing on engine deceleration;
   a slope detector and comparator means responsive to said voltage change having a negative slope for providing an output voltage;
   an indicator;
   and means responsive to said output voltage for operating said indicator.

2. The deceleration indication system claimed in claim 1, wherein said tachometer comprises:
   differentiating means for providing short positive and negative pulses in response to the leading and trailing edges of said input pulses received from the ignition system;
   rectifier means for clipping said negative pulses to leave said positive pulses;
   and monostable multivibrator means responsive to said positive pulses for providing said uniform width control pulses having a frequency proportional to the engine speed of the leading motor vehicle.

3. The deceleration indication system claimed in claim 2, wherein said voltage control circuit comprises:
   a capacitor circuit responsive to said uniform width control pulses for providing a voltage having a positive slope when the frequency of said ignition system pulses increases under acceleration;
   and means affording a discharge path for said capacitor circuit to provide said voltage with a negative slope when the frequency of said ignition system pulses decreases under deceleration.

4. The deceleration indication system claimed in claim 3, wherein said slope detector and comparator means comprises:
   an operational amplifier having a pair of input terminals and an output terminal;
   first bias means for applying a predetermined bias voltage to one of said input terminals;
   second bias means for applying a predetermined bias voltage to the other input terminal so that no output signal appears at said output terminal;
   and slope detector means responsive to said negative slope voltage for modifying the voltage applied by said second bias means to said other input terminal to cause said output voltage to appear at said output terminal.

5. The deceleration indication system claimed in claim 4, wherein said means responsive to said output voltage for operating said indicator comprises:
   a switching device;
   and offset voltage means between said operational amplifier and said switching device affording reliable turn-off of the latter.

6. The deceleration indication system claimed in claim 5, wherein:
   said indicator comprises a pair of electrical lamps mounted at the rear of the leading motor vehicle.

7. A deceleration indication system connected to the ignition system of a leading motor vehicle to provide a signal to the following driver whenever the engine speed of the leading motor vehicle decreases comprising:
   differentiator means;
   means for connecting said differentiator means to the ignition system of the leading motor vehicle to receive input voltage pulses therefrom and to provide a differential pulse signal;
   rectifier means for rectifying said differentiated pulse signal;
   a monostable multivibrator responsive to said rectified pulse signal for providing uniform width pulses having a frequency proportional to the engine speed of the leading motor vehicle;
   an energy storage circuit having a predetermined discharge rate and being responsive to said uniform width pulses for providing a voltage having a positive slope on engine acceleration and a negative slope on engine deceleration;

a voltage comparator;

means biasing said voltage comparator to respond to a negative slope voltage and provide an output voltage;

deceleration indicator means mounted to be visible by the following driver;

and means responsive to said output voltage for operating said deceleration indicator means.

* * * * *